United States Patent
Allegrucci et al.

(10) Patent No.: US 6,877,063 B1
(45) Date of Patent: Apr. 5, 2005

(54) MULTIPLE MEMORY ALIASING FOR A CONFIGURABLE SYSTEM-ON-CHIP

(75) Inventors: Jean-Didier Allegrucci, Sunnyvale, CA (US); Jerry Case, San Jose, CA (US)

(73) Assignee: Xilinx, Inc., San Jose, CA (US)

(*) Notice: Subject to any disclaimer, the term of this patent is extended or adjusted under 35 U.S.C. 154(b) by 327 days.

(21) Appl. No.: 09/746,815

(22) Filed: Dec. 22, 2000

(51) Int. Cl.[7] .............................................. G06F 12/00
(52) U.S. Cl. ...................... 711/102; 711/103; 711/202; 713/2; 326/38
(58) Field of Search ................................ 711/103, 102, 711/105; 713/1, 2, 100; 74/163

(56) References Cited

U.S. PATENT DOCUMENTS

| | | | |
|---|---|---|---|
| 5,327,531 A | * | 7/1994 | Bealkowski et al. ........... 714/6 |
| 5,568,641 A | * | 10/1996 | Nelson et al. ................. 713/2 |
| 5,624,316 A | * | 4/1997 | Roskowski et al. ............ 463/45 |
| 5,829,012 A | * | 10/1998 | Marlan et al. ............... 711/102 |
| 6,240,519 B1 | * | 5/2001 | James et al. ................. 713/202 |
| 6,262,594 B1 | * | 7/2001 | Cheung et al. ................ 326/38 |
| 6,401,164 B1 | * | 6/2002 | Bartoli et al. ................ 711/103 |
| 6,438,672 B1 | * | 8/2002 | Fischer et al. ............... 711/210 |
| 6,467,009 B1 | * | 10/2002 | Winegarden et al. ........ 710/305 |
| 6,480,948 B1 | * | 11/2002 | Virajpet et al. .............. 711/202 |
| 6,487,655 B1 | * | 11/2002 | Wildgrube et al. ............ 713/2 |
| 6,518,787 B1 | * | 2/2003 | Allegrucci et al. ............ 326/38 |
| 6,567,093 B1 | * | 5/2003 | Tai et al. ..................... 345/519 |

* cited by examiner

*Primary Examiner*—Donald Sparks
*Assistant Examiner*—Brian R. Peugh
(74) *Attorney, Agent, or Firm*—Blakely, Sokoloff Taylor & Zafman; LeRoy D. Maunu

(57) ABSTRACT

A method for multiple memory aliasing for a configurable system-on-a-chip, including executing code from an internal memory, locating a configuration program in the internal memory, disabling the internal memory alias, and jumping to a secondary initialization routine, is disclosed.

16 Claims, 3 Drawing Sheets

MULTIPLE MEMORY ALIASING FOR A CONFIGURABLE SYSTEM-ON-CHIP

FIELD OF INVENTION

The present invention is related to a system on a chip.

BACKGROUND OF THE INVENTION

In a typical system on a chip system, the memory map at reset is different than the memory map used by the application. In general, a slow external non-volatile memory such as EPROM or FLASH is mapped at the bottom of the memory at reset. It contains the application setup code such as an RTOS for example. Upon reset, the CPU starts executing at address 0 in the external non-volatile memory and sets-up the application. Part of the set-up code might place the interrupt service routines and other critical sections of the codes into a fast memory (internal RAM or fast external). Once the application setup is completed, the mapping of the non-volatile memory at the bottom of the memory is disabled. At that point, the fast memory is mapped at address 0.

SUMMARY OF THE INVENTION

A method for multiple memory aliasing for a configurable system-on-a-chip, including executing code from an internal memory, locating a configuration program in the internal memory, disabling the internal memory alias, and jumping to a secondary initialization routine, is disclosed.

These features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method for multiple memory aliasing for a configurable system-on-a-chip, including executing code from an external memory, locating a configuration program in the internal memory, disabling the internal memory alias, and jumping to a secondary initialization routine, is disclosed. The multiple memory aliasing for a configurable system-on-chip enables configuration of a system on a chip without impacting the system.

Figure 1:
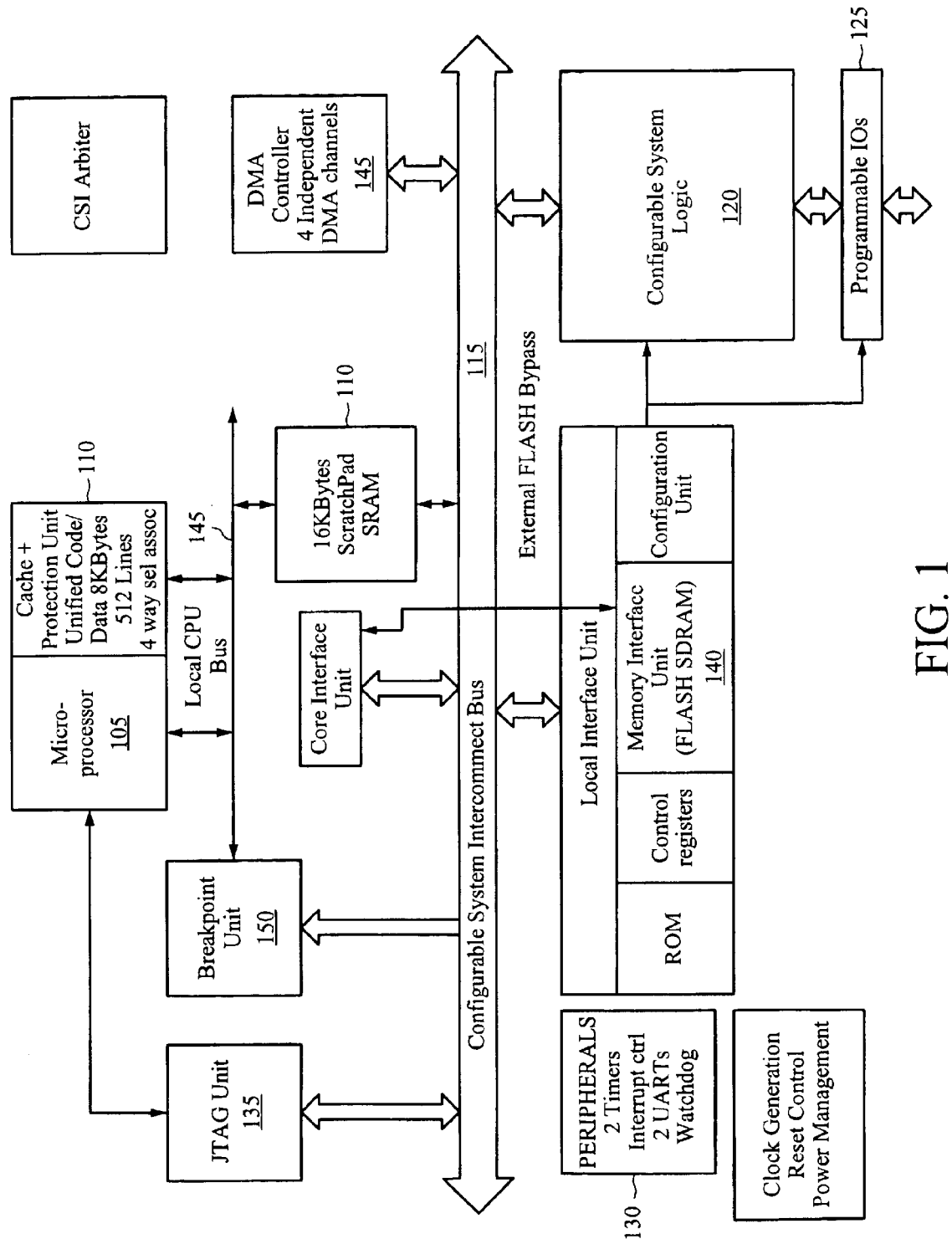
FIG. 1 shows an embodiment of a system on a chip.

As shown in FIG. 1, the system on a chip integrates, on a single device, an embedded microprocessor 105, internal static RAM (cache+searchpad) 110, a high-speed dedicated system bus 115, and configurable logic 120, which are connected to the microprocessor 105 and system bus 115. The result is a high performance, integrated, fully static single chip system for embedded systems applications. In one embodiment, the microprocessor 105 is a general-purpose 32-bit microprocessor, which supports the standard ARM 32-bit instruction set and reduced 16-bit instruction set.

The microprocessor 105 is paired with a memory 110, which may include 8 Kbyes unified code/data cache and 16 Kbytes scratch pad for storage of timing critical code or data structure, for example. The cache and additional memories may be used to improve the overall performance of the system.

The configurable logic 120, may be an embedded SRAM-based Configurable System Logic (CSL) matrix, for example. The configurable logic 120 can provide "derivative on demand" system customization. The high-performance configurable logic architecture 120 may include a highly interconnected matrix of CSL cells, for example. Resources within the matrix provide easy, seamless access to and from the internal system bus 115. Each CSL cell performs various potential functions, including combinatorial and sequential logic. The combinatorial portion performs Boolean logic operations, arithmetic functions, and memory. The sequential element performs independently or in tandem with the combinatorial function. The abundant programmable input/output blocks (PIOs) 125 provide the interface between external functions and the internal system bus or configurable system logic. Each PIO offers advanced I/O options including selectable output drive current, optional input hysteresis, and programmable low-power functionality during power-down mode.

A high-performance internal system bus 115, which may be a Configurable System Interconnect (CSI) bus, for example, interconnects the microcontroller 105, its peripherals 130, and the CSL matrix 120 at a speed of 66 MHz, for example. In one embodiment, the bus 115 provides 32 bits of read data, 32 bits of write data, and a 32-bit address. Multiple masters arbitrate for bus access. Potential bus masters include the microcontroller 105, the JTAG interface 135, the read and write channels of each DMA channel, and the memory interface unit 140 (MSSIU) in some modes of operation. Functions implemented in the CSL matrix 120 can use a DMA channel as a "proxy" master, re-using the control logic already contained in the DMA channels to become a master on the CSI bus 115. The CSI, as well as the local CPU bus 145, may follow the little endian format.

A static memory interface unit (part of the memory sub-system MSSIU 140) connects the configurable processor 120 to external static memories of the type FLASH or SRAM. The MSSIU 140 can connect to an external FLASH memory device that holds an initialization program plus the user's code. The MSSIU interface is reusable for connections to other external components. The external read, write, control, and chip-select signals are programmable providing flexible set-up, strobe, and hold timing. A direct connection from the CPU 105 to the MSSIU 140 (bypass mode) is provided to remove any additional latency incurred going through the CSI 120. For low frequency applications, the microprocessor 105 can fetch its instructions from the external FLASH directly. Assuming a FLASH with a one cycle access time, non-sequential accesses from the microprocessor incur one wait state, while sequential accesses incur no wait states.

Support for external dynamic memories provides the user with some of adding affordable and dense memories to the system. A SDRAM interface unit (part of MSSIU 140) connects the system interconnect to a variety of SDRAM types and configurations. It also supports 100-pin DIMMs. The interface can runs at 66 GHz, for example, and provides ways to optimize the interface timing for slower clocks. SDRAMs can be used as temporary memory mostly for DMA data buffering. A direct connection from the CPU 105 to the SDRAM interface 140 is also provided to remove additional CSI latency.

The pins may be shared between the FLASH and SDRAM interfaces. To provide maximum use of the CSI bandwidth and external memory bus, the cache should be enabled. A cache miss results in the CPU using the external memory bus. Minimizing the miss rate allows the higher use of the external memory bus for DMA data movement to and from SDRAM.

The four-channel DMA controller 145 provides high-bandwidth communication between functions. Its easy-to-use handshake simplifies interface and control logic. Functions from within the CSL matrix can request DMA transfers, the DMA controller providing "proxy" bus mastering capabilities. Each DMA channel can be controlled directly by the CPU or through a descriptor table that can reside anywhere within the system memory.

A set of common dedicated peripherals 130 is available. In one embodiment, the set includes 2 16-bit with pre-scalers, 2 serial controllers, a watchdog timer and an interrupt controller.

The majority of the system, including the microcontroller, can operate from a single bus clock signal. Optional sources for the bus clock include driving it directly from an off chip signal, connecting an external crystal or ceramic oscillator between the dedicated crystal-oscillator amplifier pins and synthesizing a clock frequency through the on-chip PLL, or using the internal ring oscillator. Six other global buffers provide high-fanout signals to CSL functions. The bus dock and the global buffers can optionally be stopped upon a breakpoint event and shut off during power-down mode.

Power management control provides selectable power-down options over internal functions. Furthermore, each PIO provides pin-by-pin power-down settings. An internal initialization boot ROM controls the start of initialization after power-on or after the reset pin is released. The primary purpose of the initialization boot ROM is to find the user's initialization data and code stored in the secondary boot code, usually held in external non-volatile memory. Initialization programs can be written to external flash via JTAG through the MSSIU interface.

Besides downloading initialization programs, the JTAG port offers nearly full access to the microcontroller, peripherals, and CSL functions to aid in debugging. The JTAG interface can become a bus master on the internal CSI bus. During the system application, the JTAG unit provides observability of the system with minimal system impact.

Debugging the application software is done using a set of debugging tools. A CSI breakpoint unit 150 monitors both the CPU local bus or the CSI bus. Upon a predefined set of conditions, the breakpoint unit can halt or interrupt the execution of the application program. Via JTAG control, the user can then control the behavior of the system.

Tracing of the local CPU bus or the CSI bus is also available through the breakpoint unit and the scratchpad memory. In trace mode, the upper 8 K of the scratchpad memory is reclaimed for tracing. Different trace modes are supported and are described in more details in a later chapter.

Using JTAG and the breakpoint unit, it is possible to single step the CPU, the CSL system clock and transactions on the CSI independently of each other. Single stepping on the CSI is done at the transaction level and allows a single transaction to propagate through the CSI pipeline until completed. Multiple memory aliasing for a configurable system on a chip extends the bottom of memory mapping to other memories, and also serves the configuration requirements of a configurable system-on-chip.

In the configurable system-on-chip shown in FIG. 1, the system contains an internal ROM, an external non-volatile memory (FLASH), an internal SRAM and some external SDRAM. The internal ROM is a non-volatile memory. Upon device reset, the memories are aliased at address 0. They overlay each other with the ROM having the highest priority, followed by the FLASH, then the internal scratchpad SRAM and finally the SDRAM. In addition to their aliases, all these memories have an image on top of the memory map. The ROM alias contains the necessary minimal primary initialization code. The external non-volatile memory alias is used by the RTOS and by the secondary initialization code. The SDRAM could be used to run the user application. The user program in the FLASH memory could copy and decompress itself into SDRAM. The external FLASH could be used for configuration and to hold a compressed version of the user application.

Figure 2:
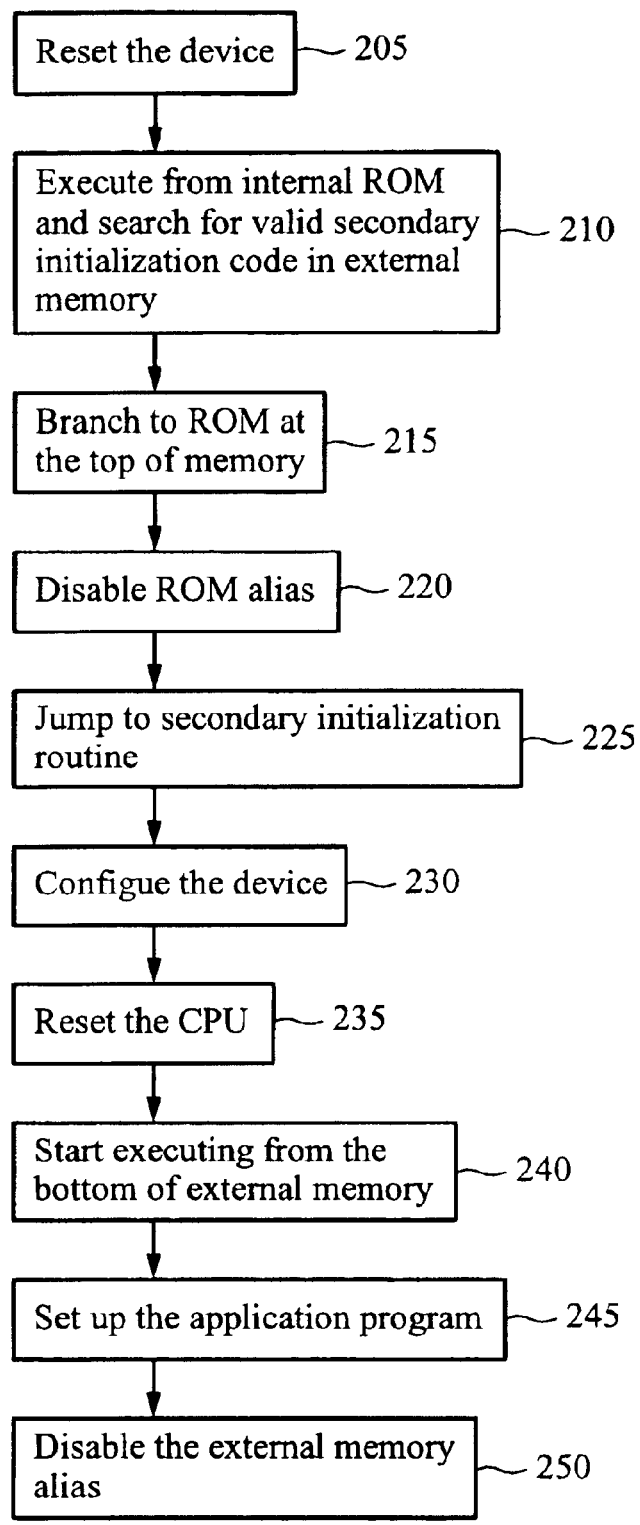
FIG. 2 shows an embodiment of a method for multiple memory aliasing.

FIG. 2 shows an embodiment of a method for multiple memory aliasing. Upon device reset 205, the CPU starts executing from the internal ROM and searches for valid secondary initialization code, 210. Once a valid configuration program is found in the external non-volatile memory, the code branches out to the ROM image at the top of the memory, 215, disables the ROM alias, 220, and then jumps to the secondary initialization routine, 225. In one embodiment, the secondary initialization code resides at the top of the external FLASH along with the RTOS and user application code at the bottom of the external FLASH. The secondary initialization code configures the device (hard and soft peripherals), 230. After the initialization sequence is completed, the control is released to the RTOS or user application by resetting the CPU, 235. It then starts executing at address 0 from the bottom of the external non-volatile memory, 240. At this point, there is no more difference between a regular processing system and the configurable system-on-chip. The application gets setup the same way it would have been if the system had been fixed all along, 245. The setup can copy the critical routines into the internal SRAM and a copy of the code in the external SDRAM for maximum performance, after which it can disable the external non-volatile memory alias, 250. All the re-mapping control can be done through control registers.

Figures 3A, 3B, 3C:
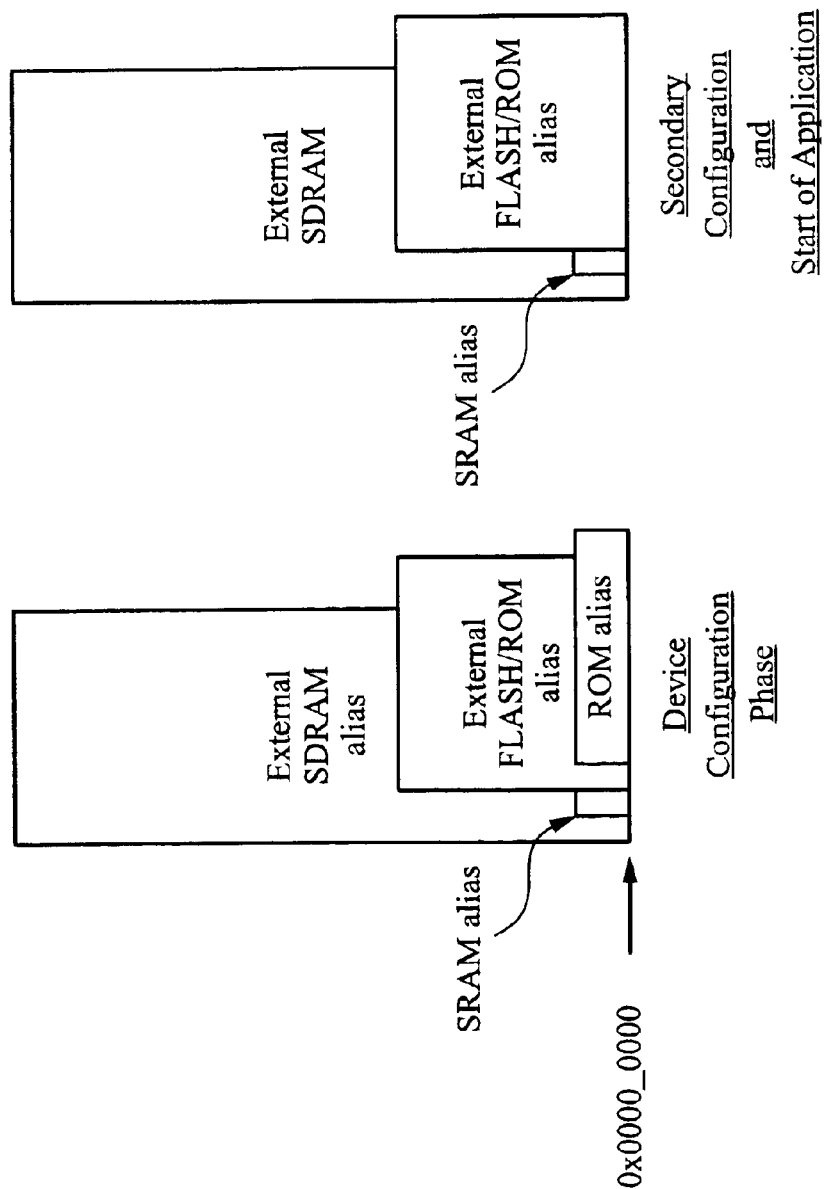
FIGS. 3A, 3B and 3C show states of memory map during configuration of a system on a chip using the method of FIG. 2.

FIGS. 3A, 3B and 3C illustrate the different states of the memory map throughout the setup of the configurable system-on-chip. FIG. 3A shows the first phase of the memory map upon device reset. FIG. 3B shows the memory map during secondary initialization and during the start of the user application. FIG. 3C shows a possible configuration during normal operation of the system.

The multiple memory aliasing for a configurable system on a chip allows the internal ROM to be added to the ARM system memory map, which traditionally consisted of only external FLASH, SRAM and SDRAM. The multiple memory aliasing allows all types of memories to be aliased to the bottom of the memory map. The multiple memory aliasing also enables programmable aliases for all types of memories. Also, multiple memory aliasing allows programmable priority of the aliasing. A user can program the priority of the external memories at the bottom of memory to satisfy different application requirements. For example, if the user wants to keep the FLASH alias at the bottom of memory, but have the scratchpad on top.

These and other embodiments of multiple memory aliasing may be realized in accordance with these teachings and it should be evident that various modifications and changes may be made in these teachings without departing from the broader spirit and scope of the invention. The specification and drawings are, accordingly, to be regarded in an illustrative rather than restrictive sense and the invention measured only in terms of the claims.

What is claimed is:

1. A method for multiple memory aliasing for a configurable system-on-a-chip, the configurable system on a chip integrating at least a central processing unit (CPU), an internal system bus, a programmable input/output, and a programmable logic, on a single integrated circuit device, the method comprising:

executing code from a read-only memory (ROM) internal memory by the CPU, said ROM internal memory having an enabled alias and fetching the code from the ROM in response to the enabled alias;

searching, by the code executing from the ROM, for a valid secondary initialization routine to configure the system including system peripherals;

disabling the ROM internal memory alias, and disabling fetching of the code from the ROM in response to the disabled alias;

jumping to the secondary initialization routine located in a FLASH external memory;

configuring the system-on-a-chip using the secondary initialization routine located in the FLASH external memory; and resetting the CPU after completion of the configuring of the system-on-a-chip.

2. The method of claim 1 further comprising:

executing code starting with the bottom of the FLASH external memory.

3. The method of claim 1, wherein the FLASH external memory has an external alias, the method further comprising:

selectively programming the alias of the ROM internal memory;

selectively programming the external alias of the FLASH external memory; and programming the priority of the alias and the external alias.

4. An apparatus for multiple memory aliasing for a configurable system-on-a-chip, the configurable system on a chip integrating at least a central processing unit, an internal system bus, a programmable input/output and a programmable logic, on a single integrated circuit device, comprising:

means for executing code from an internal memory by the CPU, said internal memory having an enabled alias, and fetching the code from the ROM in response to the enabled alias;

means for searching for a valid secondary initialization routine to configure the system_including system peripherals;

means for disabling the internal memory alias;

means for jumping to the secondary initialization routine;

means for configuring the system-on-a-chip using the secondary initialization routine; and means for resetting a central processing unit of the system-on-a-chip.

5. The apparatus of claim 4 further comprising:

means for executing code starting with the bottom of the external memory.

6. The apparatus of claim 5 further comprising: mans for setting up an application program for the system-on-a-chip from the internal memory.

7. A computer readable medium having instructions which, when executed by a processing system, cause the system to perform a method for multiple memory aliasing for a configurable system-on-a-chip, the configurable system on a chip integrating at least a central processing unity, an internal system bus, a programmable input/output, and a programmable logic, on a single integrated circuit device, the method comprising:

executing code from an internal memory by the CPU, said internal memory having an enabled alias, and fetching the code from the ROM in response to the enabled alias;

searching, by the code executing from the ROM, for a valid secondary initialization routine to configure the system including system peripherals;

disabling the internal memory alias;

jumping to the secondary initialization routine;

configure the system-on-a-chip using the secondary initialization routine; and reset a central processing unit of the system-on-a-chip.

8. The medium of claim 7, wherein the executed instructions further cause the system to:

execute code starting with the bottom of the external memory.

9. The medium of claim 8, wherein the executed instructions further cause the system to:

set up an application program for the system-on-a-chip from the internal memory.

10. A method for configuring a system-on-a-chip, comprising:

commencing execution of a primary initialization routine at a base address of address space mapped to a ROM in the system-on-a-chip by a processor in the system-on-a-chip;

transferring control, in response to a control transfer instruction executed by the processor, to a secondary initialization routine in address space to a memory device external to the system-on-a-chip, and fetching and executing code from the external memory device by the processor;

programming configurable logic resources on the system-on-a-chip by execution of the secondary initialization routine; and remapping the base address to the external memory device in response to completion of the secondary initialization routine; and commencing execution by the processor of code at the base address remapped to the external memory device.

11. The method of claim 10, further comprising resetting the processor a first time;

wherein the commencing execution of the primary initialization routine is in response to the first resetting of the processor;

resetting the processor a second time after the programming of the configurable logic resources and the remapping of the base address to the external memory.

12. The method of claim 11, further comprising mapping the base address to the ROM in response to the first resetting of the processor.

13. The method of claim 12, wherein the second resetting of the processor is performed by the secondary initialization routine.

14. The method of claim 11, wherein the first resetting of the processor is in response to powering on the system-on-a-chip.

15. The method of claim 10, further comprising executing by the processor a real-time operating system stored in the external memory beginning at the base address.

16. An apparatus for configuring a system-on-a-chip, comprising:

means for commencing execution of a primary initialization routine at a base address of address space mapped to a ROM in the system-on-a-chip by a processor in the system-on-a-chip;

means for transferring control, in response to a control transfer instruction executed by the processor, to a secondary initialization routine in address space to a memory device external to the system-on-a-chip, and fetching and executing code from the external memory device by the processor;

means for programming configurable logic resources on the system-on-a-chip by execution of the secondary initialization routine; and means for remapping the base address to the external memory device in response to completion of the secondary initialization routine; and means for commencing execution by the processor of code at the base address remapped to the external memory device.

* * * * *